(12) United States Patent
Wang et al.

(10) Patent No.: US 8,238,670 B2
(45) Date of Patent: Aug. 7, 2012

(54) METHOD, APPARATUS AND STORAGE MEDIUM FOR IMAGE CLASSIFICATION

(75) Inventors: Jianmin Wang, Beijing (CN); Xin Ji, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 958 days.

(21) Appl. No.: 12/278,270

(22) PCT Filed: Feb. 8, 2007

(86) PCT No.: PCT/CN2007/000431
§ 371 (c)(1),
(2), (4) Date: Aug. 4, 2008

(87) PCT Pub. No.: WO2007/090351
PCT Pub. Date: Aug. 16, 2007

(65) Prior Publication Data
US 2009/0022407 A1   Jan. 22, 2009

Related U.S. Application Data

(63) Continuation of application No. PCT/CN2007/000431, filed on Feb. 8, 2007.

(30) Foreign Application Priority Data

Feb. 9, 2006  (CN) .......................... 2006 1 0007324

(51) Int. Cl.
*G06K 9/62* (2006.01)
*G06K 9/68* (2006.01)
(52) U.S. Cl. .......................... 382/224; 382/227; 382/228
(58) Field of Classification Search ........... 382/224–228
See application file for complete search history.

(56) References Cited

U.S. PATENT DOCUMENTS

| | | | | |
|---|---|---|---|---|
| 5,715,377 A * | 2/1998 | Fukushima et al. | ........... | 358/1.9 |
| 5,892,592 A * | 4/1999 | Adachi et al. | .................. | 358/462 |
| 5,892,847 A * | 4/1999 | Johnson | ......................... | 382/232 |
| 5,940,530 A * | 8/1999 | Fukushima et al. | .......... | 382/164 |
| 6,636,630 B1 * | 10/2003 | Adachi et al. | .................. | 382/176 |
| 6,711,288 B2 * | 3/2004 | Kim et al. | ...................... | 382/165 |
| 6,870,960 B2 * | 3/2005 | Ogawa | .......................... | 382/236 |
| 6,915,011 B2 * | 7/2005 | Loui et al. | ...................... | 382/224 |

(Continued)

FOREIGN PATENT DOCUMENTS

| | | |
|---|---|---|
| CN | 1437162 | 8/2003 |
| CN | 1632823 | 6/2005 |
| JP | 2005-250775 | 9/2005 |

OTHER PUBLICATIONS

Vailaya, A.; Jain A.; Hong Jiang Zhang; , "On image classification: city vs. landscape," Content-Based Access of Image and Video Libraries, 1998. Proceedings. IEEE Workshop on , vol., No., pp. 3-8, Jun. 21, 1998.*

(Continued)

*Primary Examiner* — Bhavesh Mehta
*Assistant Examiner* — Utpal Shah
(74) *Attorney, Agent, or Firm* — Fitzpatrick, Cella, Harper & Scinto (57) ABSTRACT

In an image classification method, dividing an input image into blocks; obtaining block features of each block of the image; performing an evaluation of each block based on the block features thereof; obtaining image features based on the evaluations of the blocks of the image; and classifying the image based on the image features into pre-defined categories.

23 Claims, 4 Drawing Sheets

U.S. PATENT DOCUMENTS

| | | | |
|---|---|---|---|
| 6,915,025 B2 * | 7/2005 | Wang et al. | 382/289 |
| 7,010,170 B2 * | 3/2006 | Saito | 382/239 |
| 7,194,134 B2 * | 3/2007 | Bradshaw | 382/226 |
| 7,394,947 B2 * | 7/2008 | Li et al. | 382/305 |
| 7,430,314 B2 * | 9/2008 | Porter et al. | 382/159 |
| 7,478,091 B2 * | 1/2009 | Mojsilovic et al. | 1/1 |
| 7,697,754 B2 * | 4/2010 | Park et al. | 382/168 |
| 2004/0264770 A1 * | 12/2004 | Sharma et al. | 382/165 |
| 2005/0281463 A1 * | 12/2005 | Yi | 382/173 |

OTHER PUBLICATIONS

Serrano, N.; Savakis, A.; Luo, A.; , "A computationally efficient approach to indoor/outdoor scene classification," Pattern Recognition, 2002. Proceedings. 16th International Conference on , vol. 4, No., pp. 146-149 vol. 4, 2002.*

* cited by examiner

METHOD, APPARATUS AND STORAGE MEDIUM FOR IMAGE CLASSIFICATION

FIELD OF THE INVENTION

This invention relates to image classification, particularly to method, apparatus and storage medium for image classification.

BACKGROUND OF THE INVENTION

To classify images into meaningful categories is a challenging and important problem in content-based image retrieval. In many methods, a lot of features extracted from whole image are used directly for image classification. As we know, the meaningful features mainly appear in part of an image, not whole image.

"On image classification: city images vs. landscapes" by Aditya Vailaya et al, Pattern Recognition 31(12): 1921-1935 (1998) discussed content-based image classification. The discussion is based on each whole image.

SUMMARY OF THE INVENTION

The object of this invention is to develop an improved content-based image classification method, and in particular to provide a content-based image classification method based on block feature, which is extracted from a part of an image, to better describe the meaningful feature of an image.

This invention provides an image classification method, comprising the steps of:

Dividing an input image into blocks;
Obtaining the block features of each block of the image;
Obtaining an evaluation of each block based on the block features thereof;
Obtaining image features based on the evaluations of the blocks of the image;
Classifying the image based on the image features, into a category of a pre-defined content.

This invention also provides an image classification apparatus, comprising:

Image dividing unit for dividing an input image into blocks;
Block feature obtaining unit for obtaining the block features of each block of the image;
Block evaluating unit for obtaining an evaluation of each block based on the block features thereof;
Image feature obtaining unit for obtaining image features based on the evaluations of the blocks of the image;
Image classification unit for classifying the image based on the image features, into a category of a pre-defined content.

This invention also provides a storage medium encoded with machine-readable computer program code for classifying image, the storage medium including instructions for causing a processor to implement the method of this invention.

By means of this invention, an improved content-based image classification method based on block dividing and block feature is developed.

Other features and advantages of the present invention will be clearer from the following description of the preferred embodiments, taken in conjunction with the accompanying drawings, which illustrate, by way of example, the principles of the invention.

DETAILED DESCRIPTION OF THE PREFERRED EMBODIMENT

According to this invention, in a content-based image classification process, an input image is classified into a content-based category or not, i.e., the input image is identified by the classification process to contain the pre-defined content or not. An input image firstly is divided into many blocks. In many cases, the pre-defined content may be mainly contained in one or several blocks, not in all the blocks. Then an evaluation is obtained for each block. The evaluation indicates the degree to which the evaluated block contains the pre-defined content. Based on the evaluations of the blocks, the features of the input image are obtained. Said features of the input image are used to determine to what degree the input image contains the pre-defined content. Finally, the input image is classified according to the feature of the input image.

Figure 1:
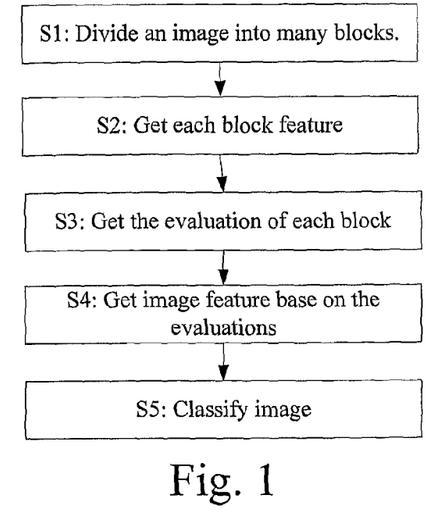
FIG. 1 is a flowchart of the image classification method according to the present invention.
Figure 2:
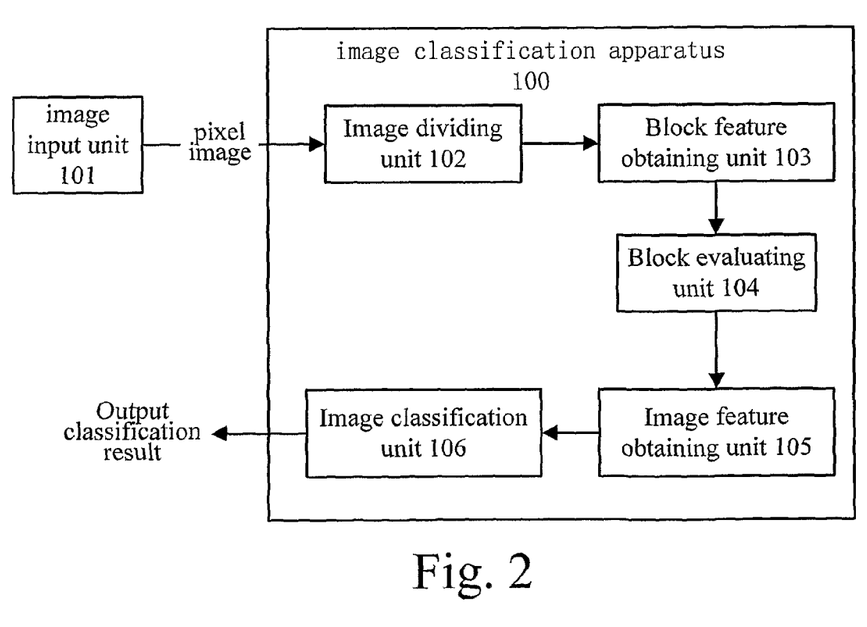
FIG. 2 shows an image classification apparatus according to this invention.

FIG. 1 is a flowchart of the image classification method according to the present invention. FIG. 2 shows an image classification apparatus 100 according to this invention.

In step S1, an input image inputted by the input unit 101 is divided by the image dividing unit 102 into blocks. The blocks can be same or different size, the same or different shape, overlap or not.

In step S2, the features of each block divided by the image dividing unit are obtained by the block feature obtaining unit 103. The features of the blocks can be, for example, color statistic values of the basic colors R, G, and B, such as the mean value of the R (red) values of the image pixels of a block, the mean value of the G (green) values of the image pixels of a block, the mean value of the B (blue) values of the image pixels of a block; the variance of R values, G values, and B values in a block with respect to the respective mean values, such as mean square variance; or the relation among the variance of the R, G, and B values, such as covariance. As known by those skilled in the art, other known features can also be used to further describe each block. As to features which are to be used to describe each block, they may be determined by considering practical conditions and effects, such as the particularities of the pre-defined content.

In step S3, based on the above features of each block from the block feature obtaining unit 103, each block is evaluated by the block evaluating unit 104 to describe to what degree the block may contain the pre-defined content. And an evaluation is obtained for each block. That is to say the relations between the features and the pre-defined content are integrally expressed as the evaluation. Many methods have been developed to evaluate an image based on the features of the image. Practically, for example, the features can be used in a weighting way to obtain the evaluation, i.e., the contribution of each feature to the evaluation can be adjusted.

In step S4, image features of the input image are obtained by the image feature obtaining unit 105 based on the evaluations of the blocks from the block evaluating unit 104. The image features contain, for example, the mean value of the evaluations of the blocks, or the mean value of the evaluations of some of the blocks, such as one second, one forth, or one eighth of the blocks which have the largest evaluations. The image features can also contain, for example, the mean square variance of the evaluations of the blocks or the mean square variance of the evaluations of some of the blocks, such as one second, one forth, or one eighth of the blocks which have the largest evaluations.

In step S5, the image is classified by the image classification unit 106 according to a classification value obtained based on the image features from the image feature obtaining unit 105. Based on the above image features, a classification value is obtained by the image classification unit 106 to describe to what degree the image may contain the pre-defined content. If it is determined by the image classification unit 106 that the classification value is not less than a predetermined threshold, the image classification unit 106 classifies the input image into the category of the pre-defined content. Otherwise, the input image is not classified into the category of the pre-defined content. Practically, for example, the image features can be used in a weighting way to obtain the classification value, i.e., the contribution of each image feature to the classification can be adjusted.

Figure 3:
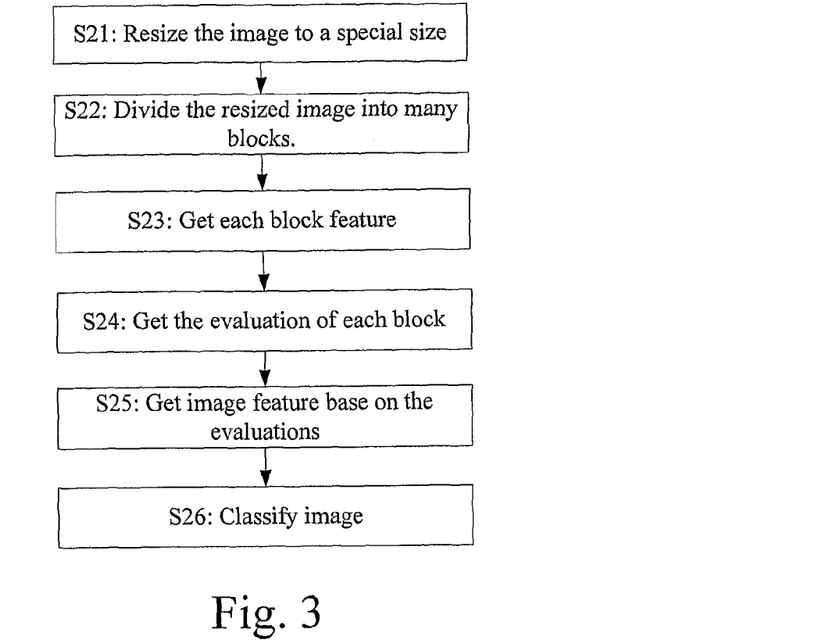
FIG. 3 is a flowchart of the image classification method according to one embodiment of the present invention.
Figure 4:
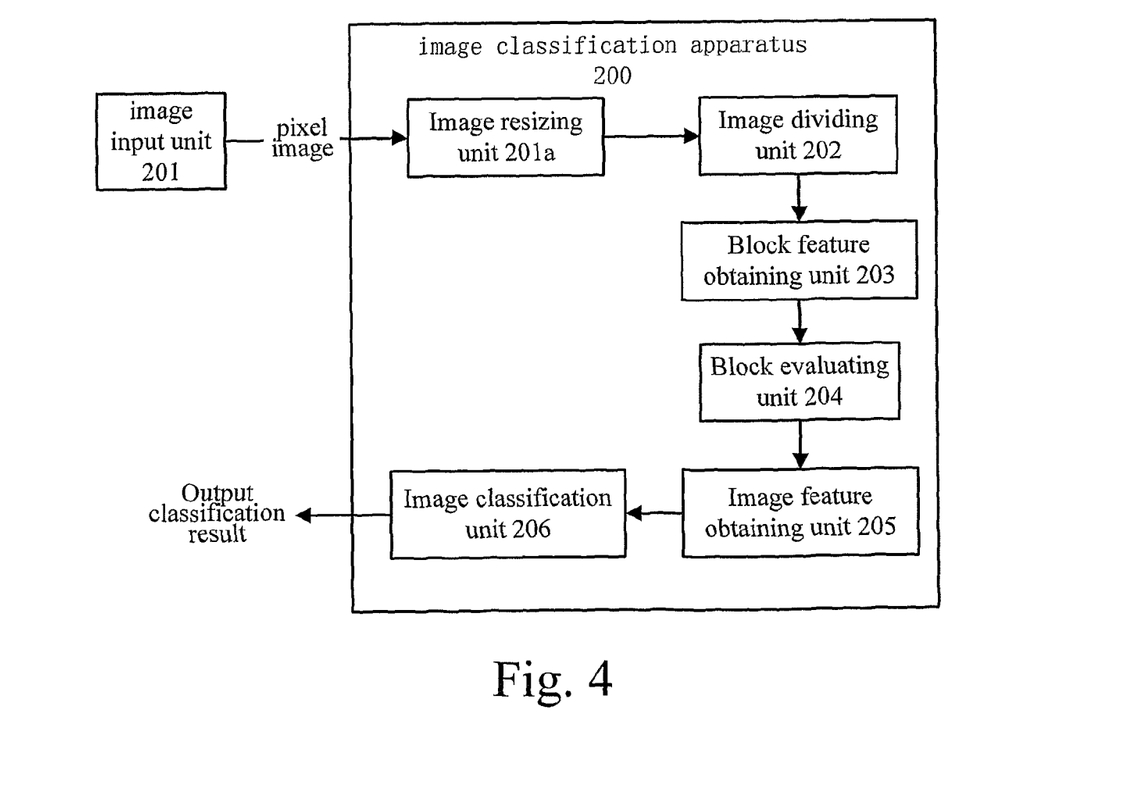
FIG. 4 is one embodiment of the image classification apparatus 200 according to this invention.

FIG. 3 is a flowchart of the image classification method according to one embodiment of the present invention. FIG. 4 is one embodiment of the image classification apparatus 200 according to this invention.

For example, based on the image classification method of FIG. 3, the image classification apparatus 200 of FIG. 4 classifies an input image as a blue-sky image or not.

The embodiment shown in FIG. 3, preferably begins with a step S21 of resizing the input image to a special size by the image resizing unit 201a to facilitate the sequent processing. In this embodiment, firstly, the image of an original size is resized by the image resizing unit 201a into new size: 19200 pixels. The ratio of image width and height is not changed.

In step S22, the resized image from the image resizing unit 201a is divided by the image dividing unit 202 into blocks as many as possible. The blocks have the same size: both width and height are 16. All blocks don't overlap.

In step S23, the block feature obtaining unit 203 obtains the features of each block, for example color statistic values of the basic colors R, G, and B. In this embodiment, r(i), g(i), b(i) represent the r, g, b value of the $i^{th}$ image pixels in a block. There are 16*16=256 pixels in a block, i=1 . . . 256.

The block feature obtaining unit 203 obtains the mean value of the R (red) values of the image pixels of a block, the mean value of the G (green) values of the image pixels of a block, and the mean value of the B (blue) values of the image pixels of a block, which are expressed as, $$f(1) = \frac{\sum_{i=1}^{256} r(i)}{256},$$

$$f(2) = \frac{\sum_{i=1}^{256} g(i)}{256},$$

$$f(3) = \frac{\sum_{i=1}^{256} b(i)}{256}.$$

The block feature obtaining unit 203 obtains the variance of R values, G values, and B values in a block with respect to the respective mean values, such as mean square variances, which are expressed as, $$f(4) = \frac{\sum_{i=1}^{256} (r(i) - f(1))^2}{256},$$

$$f(5) = \frac{\sum_{i=1}^{256} (g(i) - f(2))^2}{256},$$

$$f(6) = \frac{\sum_{i=1}^{256} (b(i) - f(3))^2}{256}.$$

The block feature obtaining unit 203 obtains the relation among the variance of the R, G, and B values, such as covariance, which is expressed as, $$f(7) = \frac{\sum_{i=1}^{256} (r(i) - f(1)) \times (g(i) - f(2))}{256},$$

$$f(8) = \frac{\sum_{i=1}^{256} (r(i) - f(1)) \times (b(i) - f(3))}{256},$$

$$f(9) = \frac{\sum_{i=1}^{256} (g(i) - f(2)) \times (b(i) - f(3))}{256}.$$

In this embodiment, the above nine features obtained by the block feature obtaining unit 203 are used to describe each block.

Then a 9-dim feature vector is obtained for each block. Let f(i) (i=1 . . . 9) be this 9-dim feature vector.

In step S24, based on the above feature vector of each block, each block is evaluated by the block evaluating unit 204 to describe to what degree the block may contain the blue-sky content. And an evaluation is obtained by the block evaluating unit 204 for each block. That is to say the relations between the features and the blue-sky content are integrally expressed as the evaluation. In this embodiment, the features in the feature vector are used in a weighting way to obtain the evaluation, i.e., the contribution of each feature to the evaluation can be adjusted.

In this embodiment, the evaluation of a block is the inner product of feature vector of the block and a given 9-dim coefficient vector. Let c(i) (i=1 . . . 9) be this 9-dim coefficient vector.

Then $$\text{Evaluation} = \frac{\sum_{i=1}^{9} f(i) \times c(i)}{9}$$

In step S25, the image features of the input image are obtained by the image feature obtaining unit 205, based on the evaluations of the blocks from the block evaluating unit 204.

In this embodiment, up to now, many evaluations are obtained since each block produces one evaluation. Let e(i) be the $i^{th}$ biggest evaluation in all evaluations. And n be the count of these evaluations So $e(i) \geq e(j)$ for any $i<j$, $(i=1 \ldots n, j=1 \ldots n)$.

The statistic values of the evaluations of the blocks of the image are obtained as follows, as the image features.

The image feature obtaining unit 205 obtains the mean value of the evaluations of the blocks, the mean square variance of the evaluations of the blocks, which are expressed as, $$imf(1) = \frac{\sum_{i=1}^{n} e(i)}{n},$$

$$imf(2) = \frac{\sum_{i=1}^{n} (e(i) - imf(1))^2}{n}.$$

The image feature obtaining unit obtains the mean value and the mean square variance of the largest one second of the evaluations of the blocks, which are expressed as, $$imf(3) = \frac{\sum_{i=1}^{n/2} e(i)}{n/2},$$

$$imf(4) = \frac{\sum_{i=1}^{n/2} (e(i) - imf(3))^2}{n/2},$$

wherein n/2 is an integralized value.

The image feature obtaining unit 205 obtains the mean value and the mean square variance of the largest one fourth of the evaluations of the blocks, which are expressed as, $$imf(5) = \frac{\sum_{i=1}^{n/4} e(i)}{n/4},$$

$$imf(6) = \frac{\sum_{i=1}^{n/4} (e(i) - imf(5))^2}{n/4},$$

wherein n/4 is an integralized values.

The image feature obtaining unit 205 obtains the mean value and the mean square variance of the largest one eighth of the evaluations of the blocks, which are expressed as, $$imf(7) = \frac{\sum_{i=1}^{n/8} e(i)}{n/8},$$

$$imf(8) = \frac{\sum_{i=1}^{n/8} (e(i) - imf(7))^2}{n/8}.$$

wherein n/8 is an integralized values.

Then the image feature obtaining unit 205 obtains an 8-dim image feature vector for the image. Let imf(i) (i=1 . . . 8) be the 8-dim image feature vector.

In step S26 of this embodiment, the image classification unit 206 classifies the image according to a classification value obtained based on the image feature vector from the image feature obtaining unit 205. The classification value is obtained by the image classification unit 206 to describe to what degree the image may contain the blue-sky content. In this embodiment, the image feature vector is used in a weighting way to obtain the classification value, i.e., the contribution of each image feature in the image feature vector, to the classification can be adjusted.

We define an 8-dim weight vector w(i), and "th" as the threshold.

If it is determined by the image classification unit 206 that $$\sum_{i=1}^{8} imf(i) \times w(i) \geq th,$$

then this image is a blue-sky image, otherwise not.

In this embodiment, also described is the method of calculating the following parameters: c(i) (i=1 . . . 9) in step S23, w(i) (i=1 . . . 8) and "th" in step S26.

1. Get many pure blue-sky images cut from the blue-sky images and many pure non-blue sky images cut from some images as the training set. Pure blue-sky images are the images that only contain the blue-sky regions, pure non-blue sky images are the images that don't contain the blue-sky regions.

2. For each image in the training set, apply the two operations of steps S21 and S22, then get feature vector f(i) (i=1 . . . 9) for each block. Then after the step, for above two kinds (blue-sky and non-blue-sky) of images, two kinds of blocks and vectors are got. Each kind is got from the corresponding kind of images.

3. Using Fisher liner classifier to train the two kinds of vectors, the weight vector c(i) (i=1 . . . 9) is got.

4. For each image, apply the operation of step S25, get vector imf(i) (i=1 . . . 8). Then for above two kinds of images, two kinds of vectors are got. Each kind is got from the corresponding kind of images.

5. Using Fisher liner classifier to train the two kinds of vectors, the weight vector w(i) (i=1 . . . 8) is got.

6. Select "th" as the threshold for inner product of imf(i) and w(i), the criterion is that Fisher liner classifier got in previous step can get best result (biggest difference of true rate and false rate) for the training set using the threshold.

A numerical example of image classification is given as follows, with respect to the blue sky image (presented as a black and white image for printing reason) shown in FIG. 6, and the non-blue sky image (presented as a black and white image for printing reason) shown in FIG. 7.

In this example, c(i) (i=1 . . . 9) is:

−3.5984 −1.3171 8.1411 0.0310 0.1250 −0.0402 −0.0259 −0.1211 −0.0740.

$w(i)$ ($i=1 \ldots 8$) is:

$$-0.81944\ -0.29196\ -2.5335\ -6.9175\ -2.4346\ 1.1157\ -0.57225\ -1.2136.$$

th is: 6974.

Figure 6:
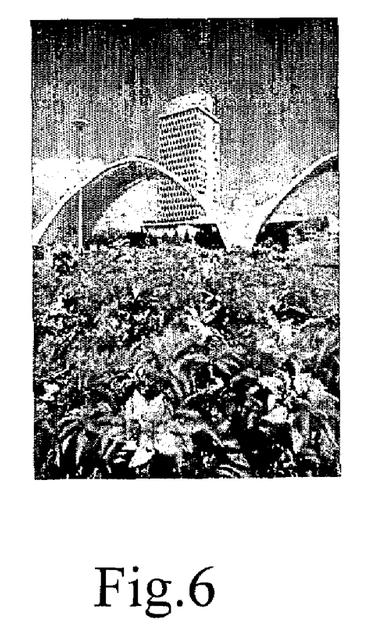
FIG. 6 shows a blue sky image to be classified according to this invention.

Consequently, with respect to the blue sky image shown in FIG. 6, the image features ($imf(i)$) are:

$$-7070.6\ 5105.2\ -3327.8\ 1104.9\ -2497.4\ 678.68\ -2270.3\ 895.1;$$

the inner product with $w(i)$ ($i=1 \ldots 8$) is 12142, which is greater than th, and is classified as blue sky.

Figure 7:
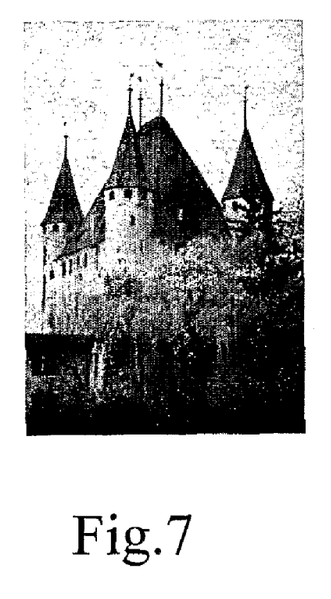
FIG. 7 shows a non-blue sky image to be classified according to this invention.

With respect to the non-blue sky image shown in FIG. 7, the image features ($imf(i)$) are:

$$-7717.9\ 8860.1\ -2255.6\ 1394.4\ -1045.1\ 410.35\ -706.23\ 141.45,$$

the inner product with $w(i)$ ($i=1 \ldots 8$) is 3041.3 which is smaller than th, and is classified as non-blue sky.

The following description is given to numerically explain how to obtain the above $c(i)$ ($i=1 \ldots 9$), $w(i)$ ($i=1 \ldots 8$), and th.

Firstly, a numerical example of the block features are given as follows.

As to a blue sky block:
the matrix of r value is

| 107 | 114 | 115 | 113 | 113 | 113 | 113 | 113 | 112 | 112 | 113 | 114 | 115 | 114 | 113 | 113 |
|-----|-----|-----|-----|-----|-----|-----|-----|-----|-----|-----|-----|-----|-----|-----|-----|
| 109 | 113 | 114 | 113 | 113 | 114 | 113 | 113 | 112 | 114 | 113 | 115 | 113 | 113 | 113 | 113 |
| 114 | 116 | 116 | 115 | 115 | 114 | 113 | 113 | 114 | 112 | 113 | 115 | 113 | 113 | 113 | 113 |
| 107 | 118 | 115 | 116 | 116 | 116 | 115 | 115 | 114 | 115 | 112 | 113 | 115 | 115 | 113 | 113 |
| 114 | 119 | 116 | 114 | 115 | 115 | 115 | 114 | 114 | 114 | 114 | 114 | 114 | 114 | 114 | 114 |
| 110 | 120 | 117 | 116 | 116 | 115 | 116 | 116 | 116 | 116 | 115 | 115 | 113 | 114 | 114 | 114 |
| 110 | 120 | 117 | 116 | 116 | 117 | 115 | 115 | 116 | 116 | 115 | 115 | 117 | 114 | 114 | 114 |
| 117 | 122 | 119 | 116 | 117 | 118 | 118 | 116 | 117 | 117 | 116 | 115 | 115 | 115 | 115 | 115 |
| 113 | 122 | 119 | 118 | 118 | 119 | 117 | 117 | 118 | 118 | 118 | 118 | 118 | 116 | 116 | 115 |
| 115 | 123 | 120 | 119 | 118 | 119 | 118 | 120 | 119 | 119 | 119 | 117 | 116 | 118 | 117 | 116 |
| 115 | 123 | 120 | 120 | 117 | 119 | 118 | 120 | 119 | 119 | 117 | 118 | 116 | 117 | 119 | 118 |
| 119 | 124 | 122 | 120 | 120 | 120 | 119 | 120 | 119 | 120 | 120 | 119 | 119 | 120 | 122 | 119 |
| 117 | 124 | 121 | 120 | 121 | 120 | 120 | 119 | 120 | 120 | 120 | 119 | 119 | 121 | 121 | 119 |
| 120 | 128 | 126 | 125 | 124 | 123 | 123 | 124 | 123 | 124 | 125 | 122 | 124 | 123 | 123 | 120 |
| 122 | 128 | 126 | 125 | 126 | 126 | 123 | 124 | 123 | 122 | 123 | 124 | 126 | 120 | 122 | 120 |
| 123 | 128 | 125 | 125 | 125 | 125 | 125 | 123 | 124 | 125 | 125 | 125 | 125 | 125 | 126 | 121 | the matrix of g value is

| 166 | 168 | 168 | 167 | 167 | 167 | 167 | 167 | 166 | 166 | 167 | 168 | 169 | 168 | 167 | 167 |
|-----|-----|-----|-----|-----|-----|-----|-----|-----|-----|-----|-----|-----|-----|-----|-----|
| 168 | 167 | 167 | 167 | 167 | 168 | 167 | 167 | 166 | 168 | 167 | 169 | 167 | 167 | 167 | 167 |
| 173 | 169 | 169 | 169 | 169 | 168 | 167 | 167 | 168 | 166 | 167 | 169 | 167 | 167 | 167 | 167 |
| 166 | 166 | 168 | 168 | 168 | 168 | 167 | 167 | 168 | 169 | 166 | 167 | 169 | 169 | 167 | 167 |
| 173 | 167 | 169 | 166 | 167 | 167 | 167 | 166 | 168 | 168 | 168 | 168 | 168 | 168 | 168 | 168 |
| 167 | 167 | 168 | 168 | 168 | 167 | 168 | 168 | 168 | 168 | 169 | 169 | 167 | 168 | 168 | 168 |
| 167 | 167 | 168 | 168 | 168 | 169 | 167 | 167 | 168 | 168 | 169 | 169 | 171 | 168 | 168 | 168 |
| 174 | 169 | 170 | 168 | 169 | 170 | 170 | 168 | 169 | 169 | 170 | 169 | 169 | 169 | 169 | 169 |
| 170 | 169 | 170 | 170 | 170 | 171 | 169 | 169 | 170 | 170 | 170 | 170 | 170 | 168 | 168 | 169 |
| 172 | 170 | 171 | 171 | 170 | 171 | 170 | 172 | 171 | 171 | 171 | 169 | 168 | 170 | 169 | 170 |
| 172 | 170 | 171 | 172 | 169 | 171 | 170 | 172 | 171 | 171 | 169 | 170 | 168 | 169 | 171 | 172 |
| 176 | 172 | 174 | 173 | 172 | 172 | 171 | 172 | 171 | 172 | 172 | 171 | 171 | 171 | 173 | 173 |
| 174 | 172 | 173 | 173 | 173 | 172 | 172 | 171 | 172 | 172 | 172 | 171 | 171 | 172 | 172 | 172 |
| 172 | 172 | 175 | 174 | 173 | 172 | 172 | 173 | 172 | 173 | 174 | 171 | 173 | 172 | 172 | 175 |
| 174 | 172 | 175 | 174 | 175 | 175 | 172 | 173 | 172 | 171 | 172 | 173 | 175 | 169 | 171 | 175 |
| 175 | 172 | 174 | 174 | 174 | 174 | 174 | 172 | 173 | 174 | 174 | 174 | 174 | 174 | 175 | 176 | the matrix or t value is

| 210 | 212 | 212 | 214 | 214 | 214 | 214 | 214 | 213 | 213 | 214 | 215 | 216 | 215 | 214 | 214 |
|-----|-----|-----|-----|-----|-----|-----|-----|-----|-----|-----|-----|-----|-----|-----|-----|
| 212 | 211 | 211 | 214 | 214 | 215 | 214 | 214 | 213 | 215 | 214 | 216 | 214 | 214 | 214 | 214 |
| 217 | 213 | 213 | 216 | 216 | 215 | 214 | 214 | 215 | 213 | 214 | 216 | 214 | 214 | 214 | 214 |
| 210 | 212 | 212 | 215 | 215 | 215 | 214 | 214 | 214 | 215 | 212 | 213 | 215 | 216 | 214 | 214 |
| 217 | 213 | 213 | 213 | 214 | 214 | 214 | 213 | 214 | 214 | 214 | 214 | 214 | 215 | 215 | 215 |
| 212 | 213 | 213 | 215 | 215 | 214 | 215 | 215 | 215 | 215 | 215 | 213 | 214 | 214 | 214 | 214 |
| 212 | 213 | 213 | 215 | 215 | 216 | 214 | 214 | 215 | 215 | 215 | 215 | 217 | 214 | 214 | 214 |
| 219 | 215 | 215 | 216 | 217 | 217 | 215 | 216 | 216 | 216 | 215 | 215 | 215 | 215 | 215 | 215 |
| 215 | 215 | 215 | 217 | 217 | 218 | 216 | 216 | 217 | 217 | 217 | 217 | 217 | 215 | 215 | 215 |
| 217 | 216 | 216 | 218 | 217 | 218 | 217 | 219 | 218 | 218 | 218 | 216 | 215 | 217 | 216 | 216 |
| 217 | 214 | 216 | 219 | 216 | 218 | 217 | 219 | 218 | 218 | 216 | 217 | 215 | 216 | 218 | 218 |
| 219 | 210 | 214 | 215 | 219 | 219 | 218 | 219 | 218 | 219 | 219 | 218 | 218 | 218 | 220 | 219 |
| 217 | 210 | 213 | 215 | 220 | 219 | 219 | 218 | 219 | 219 | 219 | 218 | 218 | 219 | 219 | 216 |

| | | | | | | | | | | | | | | | |
|---|---|---|---|---|---|---|---|---|---|---|---|---|---|---|---|
| 222 | 219 | 218 | 217 | 216 | 215 | 215 | 216 | 215 | 216 | 217 | 214 | 216 | 215 | 215 | 216 |
| 224 | 219 | 218 | 217 | 218 | 218 | 215 | 216 | 215 | 214 | 215 | 216 | 218 | 212 | 214 | 216 |
| 225 | 219 | 217 | 217 | 217 | 217 | 217 | 215 | 216 | 217 | 217 | 217 | 217 | 217 | 218 | 217 | the 9-dim feature vector is, 117.6563 169.8672 215.6055 17.2618 6.3744 4.8908 8.7738 5.0521 3.8376.

the evaluation (the inner product of the 9-dim feature vector with $c(i)$ ($i=1 \ldots 9$) is 1108.2.

As to a non-blue sky block:

the matrix of r value is

| | | | | | | | | | | | | | | | |
|---|---|---|---|---|---|---|---|---|---|---|---|---|---|---|---|
| 167 | 131 | 55 | 109 | 94 | 74 | 163 | 187 | 161 | 47 | 60 | 108 | 17 | 97 | 122 | 42 |
| 48 | 77 | 91 | 74 | 30 | 99 | 0 | 171 | 131 | 80 | 114 | 36 | 31 | 73 | 55 | 101 |
| 99 | 109 | 77 | 50 | 45 | 35 | 172 | 79 | 102 | 167 | 127 | 140 | 141 | 101 | 84 | 77 |
| 83 | 123 | 78 | 103 | 83 | 117 | 129 | 104 | 130 | 127 | 225 | 81 | 171 | 57 | 107 | 104 |
| 70 | 80 | 134 | 59 | 41 | 20 | 86 | 0 | 132 | 44 | 51 | 101 | 66 | 54 | 131 | 129 |
| 154 | 102 | 0 | 37 | 118 | 42 | 45 | 44 | 48 | 42 | 70 | 60 | 38 | 13 | 19 | 114 |
| 45 | 18 | 34 | 99 | 105 | 32 | 183 | 22 | 41 | 54 | 62 | 31 | 106 | 69 | 20 | 86 |
| 79 | 111 | 2 | 81 | 42 | 44 | 111 | 49 | 88 | 78 | 59 | 56 | 90 | 60 | 71 | 88 |
| 70 | 71 | 46 | 27 | 35 | 88 | 9 | 87 | 9 | 23 | 81 | 93 | 25 | 84 | 91 | 19 |
| 56 | 68 | 38 | 44 | 14 | 39 | 21 | 92 | 59 | 22 | 105 | 26 | 136 | 78 | 29 | 39 |
| 40 | 70 | 23 | 87 | 46 | 48 | 138 | 0 | 7 | 21 | 98 | 32 | 34 | 50 | 44 | 27 |
| 77 | 5 | 66 | 41 | 131 | 87 | 46 | 22 | 36 | 10 | 62 | 92 | 30 | 57 | 95 | 86 |
| 55 | 37 | 161 | 108 | 71 | 110 | 132 | 48 | 14 | 21 | 45 | 23 | 31 | 64 | 42 | 15 |
| 36 | 73 | 38 | 39 | 32 | 72 | 9 | 41 | 45 | 52 | 15 | 0 | 28 | 33 | 25 | 21 |
| 24 | 31 | 72 | 31 | 25 | 70 | 9 | 122 | 14 | 26 | 27 | 100 | 31 | 30 | 19 | 37 |
| 26 | 6 | 61 | 55 | 24 | 57 | 52 | 11 | 36 | 12 | 116 | 89 | 27 | 11 | 31 | 22 | the matrix of g value is

| | | | | | | | | | | | | | | | |
|---|---|---|---|---|---|---|---|---|---|---|---|---|---|---|---|
| 206 | 153 | 68 | 130 | 115 | 102 | 181 | 212 | 202 | 86 | 96 | 144 | 38 | 112 | 147 | 64 |
| 73 | 92 | 108 | 89 | 42 | 116 | 23 | 208 | 177 | 121 | 149 | 70 | 58 | 101 | 79 | 124 |
| 129 | 139 | 104 | 73 | 69 | 61 | 204 | 119 | 140 | 207 | 168 | 174 | 176 | 129 | 107 | 108 |
| 116 | 153 | 116 | 145 | 128 | 165 | 175 | 150 | 175 | 172 | 255 | 119 | 213 | 103 | 151 | 143 |
| 112 | 124 | 182 | 103 | 87 | 58 | 124 | 33 | 163 | 81 | 89 | 140 | 105 | 92 | 172 | 171 |
| 190 | 138 | 26 | 76 | 160 | 83 | 81 | 83 | 74 | 67 | 101 | 92 | 72 | 43 | 46 | 149 |
| 82 | 58 | 76 | 138 | 144 | 72 | 213 | 50 | 70 | 78 | 91 | 46 | 127 | 98 | 45 | 120 |
| 112 | 141 | 38 | 119 | 75 | 74 | 139 | 61 | 107 | 100 | 87 | 83 | 114 | 92 | 109 | 124 |
| 105 | 107 | 73 | 52 | 68 | 131 | 33 | 104 | 26 | 42 | 103 | 124 | 51 | 116 | 124 | 45 |
| 89 | 98 | 65 | 62 | 42 | 81 | 45 | 118 | 84 | 38 | 125 | 58 | 168 | 110 | 62 | 69 |
| 71 | 100 | 53 | 121 | 74 | 74 | 176 | 34 | 30 | 34 | 130 | 64 | 63 | 78 | 71 | 56 |
| 106 | 32 | 91 | 63 | 154 | 123 | 86 | 52 | 66 | 28 | 100 | 127 | 68 | 98 | 124 | 113 |
| 81 | 59 | 197 | 148 | 111 | 154 | 171 | 84 | 41 | 48 | 84 | 47 | 58 | 89 | 54 | 28 |
| 53 | 98 | 74 | 80 | 69 | 102 | 42 | 76 | 66 | 78 | 53 | 15 | 46 | 48 | 34 | 33 |
| 45 | 52 | 102 | 54 | 47 | 97 | 40 | 150 | 33 | 46 | 58 | 123 | 46 | 44 | 31 | 51 |
| 39 | 25 | 86 | 75 | 44 | 88 | 80 | 27 | 51 | 28 | 147 | 114 | 42 | 26 | 44 | 37 | the matrix of b value is

| | | | | | | | | | | | | | | | |
|---|---|---|---|---|---|---|---|---|---|---|---|---|---|---|---|
| 153 | 107 | 25 | 74 | 59 | 44 | 139 | 170 | 146 | 29 | 35 | 98 | 0 | 73 | 107 | 17 |
| 31 | 51 | 72 | 50 | 6 | 71 | 0 | 154 | 105 | 55 | 93 | 20 | 15 | 53 | 17 | 70 |
| 69 | 75 | 49 | 31 | 19 | 13 | 157 | 59 | 79 | 144 | 102 | 113 | 122 | 91 | 65 | 49 |
| 47 | 81 | 43 | 82 | 63 | 103 | 111 | 86 | 116 | 107 | 206 | 60 | 149 | 31 | 76 | 78 |
| 26 | 49 | 108 | 42 | 22 | 1 | 65 | 0 | 103 | 11 | 38 | 93 | 58 | 35 | 106 | 105 |
| 118 | 74 | 0 | 19 | 96 | 27 | 37 | 26 | 35 | 25 | 44 | 42 | 21 | 0 | 0 | 83 |
| 28 | 6 | 28 | 85 | 87 | 19 | 161 | 0 | 22 | 42 | 47 | 15 | 88 | 52 | 3 | 69 |
| 55 | 91 | 0 | 82 | 28 | 22 | 88 | 23 | 62 | 61 | 39 | 40 | 62 | 25 | 34 | 50 |
| 47 | 46 | 30 | 10 | 15 | 78 | 0 | 70 | 0 | 10 | 65 | 80 | 16 | 66 | 71 | 0 |
| 32 | 48 | 12 | 22 | 0 | 35 | 11 | 73 | 45 | 9 | 88 | 9 | 121 | 60 | 9 | 19 |
| 12 | 48 | 3 | 70 | 23 | 35 | 129 | 0 | 2 | 14 | 89 | 17 | 17 | 29 | 28 | 10 |
| 48 | 0 | 51 | 24 | 110 | 62 | 24 | 0 | 32 | 6 | 49 | 71 | 9 | 38 | 68 | 62 |
| 36 | 20 | 136 | 86 | 51 | 93 | 124 | 36 | 6 | 7 | 29 | 11 | 25 | 60 | 32 | 8 |
| 21 | 58 | 12 | 24 | 15 | 52 | 0 | 34 | 33 | 41 | 4 | 0 | 22 | 27 | 15 | 9 |
| 14 | 19 | 52 | 10 | 11 | 52 | 0 | 110 | 5 | 18 | 14 | 94 | 27 | 21 | 9 | 28 |
| 22 | 0 | 44 | 38 | 7 | 44 | 32 | 0 | 22 | 0 | 90 | 74 | 23 | 3 | 24 | 18 |

The 9-dim feature vector is,

| | | | | | | | | |
|---|---|---|---|---|---|---|---|---|
| 65.641 | 95.09 | 47.918 | 1847.4 | 2216.9 | 1609.1 | 1992.1 | 1694.3 | 1821.7 |

Evaluation (the inner product of the 9-dim feature vector with $c(i)$ (i=1 . . . 9)) is −93.2237.

A numerical example of training is given as follows.

Firstly, training of $c(i)$ (i=1 . . . 9) is as follows.

Samples of blue sky blocks $f(i)$ are listed as follows.

Each row is a sample. Totally 9933 block samples are used, only 10 of which are listed here.

| | | | | | | | | |
|---|---|---|---|---|---|---|---|---|
| 161.25 | 184.50 | 206.88 | 25.04 | 3.30 | 6.30 | 6.07 | 11.36 | 3.99 |
| 169.14 | 186.36 | 205.47 | 5.56 | 5.07 | 7.36 | 5.21 | 3.36 | 3.94 |
| 173.01 | 189.11 | 206.61 | 6.20 | 5.00 | 6.63 | 5.29 | 4.70 | 3.97 |
| 161.83 | 184.80 | 207.30 | 14.88 | 2.64 | 4.10 | 3.39 | 6.72 | 2.73 |
| 168.39 | 187.34 | 205.98 | 13.75 | 3.66 | 6.23 | 4.61 | 4.73 | 2.30 |
| 174.57 | 189.28 | 206.62 | 5.70 | 4.26 | 3.74 | 2.46 | 3.66 | 2.81 |
| 162.34 | 185.16 | 207.71 | 14.00 | 3.99 | 4.57 | 3.84 | 6.52 | 3.71 |
| 168.96 | 186.99 | 205.88 | 9.41 | 4.42 | 7.07 | 4.67 | 3.41 | 3.50 |
| 172.38 | 189.57 | 206.28 | 10.16 | 9.26 | 8.10 | 4.33 | 5.56 | 7.08 |
| 78.45 | 104.54 | 137.51 | 9.27 | 9.83 | 9.59 | 9.42 | 9.37 | 9.70 |
| . . . | | | | | | | | |

Samples non-blue sky blocks $f(i)$ are listed as follows.

Each row is a sample. Totally 17758 block samples are used, only 10 of which are listed here.

| | | | | | | | | |
|---|---|---|---|---|---|---|---|---|
| 37.51 | 15.51 | 17.51 | 5.41 | 5.41 | 5.41 | 5.41 | 5.41 | 5.41 |
| 87.88 | 33.32 | 28.98 | 1051.33 | 389.04 | 281.66 | 569.30 | 389.67 | 302.08 |
| 70.05 | 30.72 | 25.68 | 289.16 | 192.32 | 155.38 | 226.66 | 189.93 | 167.39 |
| 51.17 | 20.77 | 23.04 | 14.55 | 10.02 | 9.71 | 8.24 | 10.22 | 9.27 |
| 105.32 | 63.16 | 41.61 | 3589.80 | 3206.25 | 2284.21 | 3305.04 | 2478.39 | 2545.10 |
| 60.09 | 25.81 | 19.33 | 820.77 | 510.48 | 187.10 | 620.97 | 279.24 | 261.18 |
| 97.04 | 48.68 | 29.00 | 25.49 | 28.93 | 10.66 | 27.04 | 14.09 | 14.35 |
| 69.59 | 30.71 | 23.46 | 327.86 | 252.94 | 178.30 | 277.40 | 191.48 | 188.94 |
| 51.18 | 49.40 | 27.79 | 820.74 | 1389.68 | 452.49 | 990.96 | 562.71 | 690.27 |
| 91.81 | 46.74 | 28.40 | 46.89 | 37.04 | 10.97 | 38.82 | 17.82 | 16.28 |
| . . . | | | | | | | | |

The $c(i)$ (i=1 . . . 9) obtained through training is:

| |
|---|
| −3.5984 −1.3171 8.1411 0.0310 0.1250 −0.0402 −0.0259 −0.1211 −0.0740. |

Training of $w(i)$ (i=1 . . . 8) is as follows

Samples of blue sky images ($imf(i)$) are listed as follows.

Each row is a sample. Totally 1001 image samples are used, only 10 of which are listed here.

| | | | | | | | |
|---|---|---|---|---|---|---|---|
| −4294.7 | 3947.4 | −1810 | 1420.5 | −499.41 | 297.31 | −265.71 | 107.21 |
| −5894.1 | 5971.2 | −3243.9 | 669.02 | −2723.4 | 534.08 | −2337.6 | 521.38 |
| −5229.1 | 3974.9 | −2209.9 | 1191.3 | −1197.1 | 556.14 | −852.22 | 507.75 |
| −7741.1 | 6747.2 | −3532.8 | 785.59 | −3020.4 | 815.49 | −2475.8 | 870.44 |
| −5311.6 | 3038.7 | −3240.9 | 912.08 | −2527.3 | 644.45 | −2028.5 | 533.04 |
| −5317.2 | 5601.3 | −1530.9 | 887.1 | −868.35 | 450.55 | −720.79 | 585.16 |
| −6503.6 | 5593.3 | −4041.5 | 1136.8 | −3269.6 | 1180.2 | −2354.5 | 970.65 |
| −5622 | 3319.5 | −3802.8 | 563.24 | −3366.1 | 447.2 | −3077.2 | 478.51 |
| −5372.1 | 3162 | −3167.4 | 667.87 | −2711.1 | 651.08 | −2256.5 | 663.74 |
| −7562.1 | 5326.9 | −4032.7 | 1999.7 | −2479.2 | 1687.2 | −1074.9 | 1031 |
| . . . | | | | | | | |

Samples of non-blue sky images ($imf(i)$) are listed as follows.

Each row is a sample. Totally 2469 image samples are used, only 10 of which are listed here.

| | | | | | | | |
|---|---|---|---|---|---|---|---|
| −9451.2 | 7478.4 | −3776.3 | 1472.1 | −2679.3 | 1265.7 | −2198.7 | 1610.7 |
| −5752.9 | 2926.4 | −3911.5 | 775.24 | −3209.4 | 371.95 | −2876 | 155.79 |
| −7556.3 | 8430.2 | −3034.5 | 1672.4 | −1533.8 | 948.26 | −872.1 | 738.72 |
| −4737 | 4224.2 | −1619.6 | 1179.8 | −673.85 | 441.18 | −323.48 | 308.41 |
| −4671.7 | 3917.4 | −2349.9 | 1262.8 | −1272.4 | 763.57 | −583.62 | 193.82 |
| −6135.9 | 5062.4 | −3643.6 | 1248.5 | −2669.7 | 1082.7 | −1830.2 | 894.28 |
| −7763.6 | 7765.8 | −2932.6 | 1998.6 | −1104.9 | 1120.8 | −333.51 | 570.27 |
| −5508 | 5359.6 | −1965.3 | 1445 | −686.85 | 707.97 | −65.517 | 64.766 |
| −5672.6 | 2604.8 | −4068.5 | 981.61 | −3603.2 | 1209.1 | −3071.9 | 1552.3 |
| −5685.3 | 7713.1 | −434.93 | 632.48 | 2.9443 | 225.9 | 161.6 | 225.57 |
| . . . | | | | | | | |

The w(i) (i=1 ... 8) obtained through training is:
−0.81944 −0.29196 −2.5335 −6.9175 −2.4346 1.1157 −0.57225 −1.2136.

th is 6974.

Figure 5:
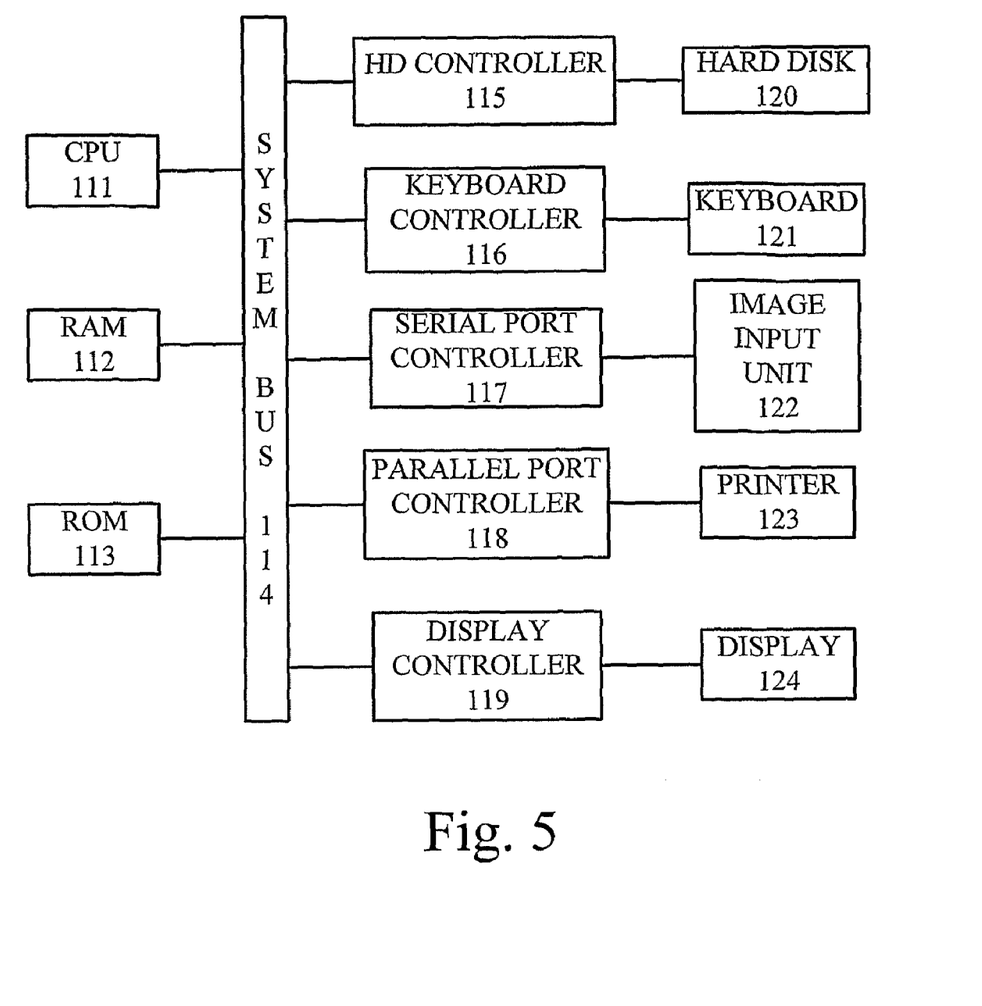
FIG. 5 schematically shows an image classification system in which the method of this invention can be implemented.

FIG. 5 schematically shows an image classification system in which the method of this invention can be implemented. The image processing system shown in FIG. 5 comprises a CPU (Central Processing Unit) 111, a RAM (Random Access Memory) 112, a ROM (Read only Memory) 113, a system bus 114, a HD (Hard Disk) controller 115, a keyboard controller 116, a serial port controller 117, a parallel port controller 118, a display controller 119, a hard disk 120, a keyboard 121, an image input unit 122, a printer 123 and a display 124. Among these components, connected to system bus 114 are CPU 111, RAM 112, ROM 113, HD controller 115, keyboard controller 116, serial port controller 117, parallel port controller 118 and display controller 119. Hard disk 120 is connected to HD controller 115, and keyboard 121 to keyboard controller 116, image input unit 122 to serial port controller 117, printer 123 to parallel port controller 118, and display 124 to display controller 119.

The functions of each component in FIG. 5 are well known in the art and the architecture shown in FIG. 5 is conventional. Such an architecture not only applies to personal computers, but also applies to other computer based apparatus. In different applications, some of the components shown in FIG. 5 may be omitted, and the system can be implemented as a single chip microcomputer. If application software is stored in EPROM or other non-volatile memories, HD controller 115 and hard disk 120 could be omitted.

The whole system shown in FIG. 5 is controlled by computer readable instructions, which are usually stored as software in hard disk 120 (or as stated above, in EPROM, or other non-volatile memory). The software can also be downloaded from the network (not shown in the figure). The software, either saved in hard disk 120 or downloaded from the network, can be loaded into RAM 112, and executed by CPU 111 for implementing the functions defined by the software.

It involves no inventive work for persons skilled in the art to develop one or more pieces of software based on the method of this invention. The software thus developed will carry out the method of classifying images shown in FIG. 1 and FIG. 3.

In some sense, the image processing system shown in FIG. 5, if supported by software developed based on the method of this invention, achieves the same functions as the apparatus for processing image shown in FIG. 2 and FIG. 4.

The present invention also provides a storage medium encoded with machine-readable computer program code for image processing, the storage medium including instructions for causing a processor to implement the method according to the present invention. The storage medium may be any tangible media, such as floppy diskettes, CD-ROMs, hard drives (e.g., hard disk 120 in FIG. 5).

While the foregoing has been with reference to specific embodiments of the invention, it will be appreciated by those skilled in the art that these are illustrations only and that changes in these embodiments can be made without departing from the principles of the invention, the scope of which is defined by the appended claims.

What is claimed is:

1. An image classification method, comprising the steps of:
dividing an input image into blocks;
obtaining a plurality of types of color statistic values of pixels in each block of the image;
performing an evaluation of each block by calculating a weighted sum of the plurality of types of color statistic values of pixels in the block, in which the plurality of types of color statistic values are respectively weighted;
obtaining image features based on the evaluations of the blocks of the image; and
classifying the image based on the image features into pre-defined categories.

2. An image classification method according to claim 1, further comprising the step of resizing the input image to predetermined size before dividing.

3. An image classification method according to claim 2, wherein, in the step of resizing, the ratio of image width and height is not changed.

4. An image classification method according to claim 1, wherein the plurality of types of color statistic values are mean values, mean square variances or covariance of the values.

5. An image classification method according to claim 1, wherein the image features of the image are statistic values of the evaluations of the blocks of the image.

6. An image classification method according to claim 5, wherein the statistic values are mean values or mean square variances.

7. An image classification method according to claim 6, wherein the mean values or mean square variances are that of some largest evaluations of the blocks of the image.

8. An image classification method according to claim 1, wherein, in the classifying step, a classification value is obtained by summing up respectively weighted image features of the image.

9. An image classification method according to claim 8, wherein, in the classifying step, comparing the classification value with a predetermined value to determine whether the image is classified into a category of a pre-defined content or not.

10. An image classification method according to claim 9, wherein the classification value indicates the degree to which the image contains the pre-defined content.

11. An image classification method according to claim 1, wherein the evaluation of a block indicates the degree to which the block contains pre-defined content.

12. An image classification apparatus, comprising:
image dividing means for dividing an input image into blocks;
block feature obtaining means for obtaining the a plurality of types of color statistic values of pixels in each block of the image;
block evaluating means for performing an evaluation of each block by calculating a weighted sum of the plurality of types of color statistic values of pixels in the block, in which the plurality of types of color statistic values are respectively weighted;
image feature obtaining means for obtaining image features based on the evaluations of the blocks of the image; and
image classification means for classifying the image based on the image features into pre-defined categories.

13. An image classification apparatus according to claim 12, further comprising image resizing means for resizing the input image to a predetermined size before being divided by the image dividing means.

14. An image classification apparatus according to claim 13, wherein when the image resizing means resizes the input image, the image resizing means does not change the ratio of image width and height.

15. An image classification apparatus according to claim 12, wherein the plurality of types of color statistic values are mean values, mean square variances or covariance of the values.

16. An image classification apparatus according to claim 12, wherein the image features of the image are statistic values of the evaluations of the blocks of the image.

17. An image classification apparatus according to claim 16, wherein the statistic values are mean values or mean square variances.

18. An image classification apparatus according to claim 16, wherein the mean values or mean square variances are that of some largest evaluations of the blocks of the image.

19. An image classification apparatus according to claim 12, wherein the image classification means obtains a classification value of the image by summing up respectively weighted image features of the image.

20. An image classification apparatus according to claim 19, wherein the image classification means compares the classification value with a predetermined value to determine whether the image is classified into a category of a pre-defined content or not.

21. An image classification apparatus according to claim 20, wherein the classification value indicates the degree to which the image contains the pre-defined content.

22. An image classification apparatus according to claim 12, wherein the evaluation of a block indicates the degree to which the block contains pre-defined content.

23. A non-transitory computer readable storage medium storing a program for classifying an image, the program including instructions for causing a computer to implement the method according to any one of claims 1 to 11.

* * * * *